United States Patent [19]
Guertin

[11] Patent Number: 6,041,817
[45] Date of Patent: Mar. 28, 2000

[54] PROCESSING SYSTEM HAVING VACUUM MANIFOLD ISOLATION

[75] Inventor: Ronald R. Guertin, Scarborough, Me.

[73] Assignee: Fairchild Semiconductor Corp., South Portland, Me.

[21] Appl. No.: 09/138,174

[22] Filed: Aug. 21, 1998

[51] Int. Cl.[7] .................................................. G05D 16/00
[52] U.S. Cl. ...................... 137/565.23; 137/614
[58] Field of Search ............................... 137/565.23, 614

[56] References Cited

U.S. PATENT DOCUMENTS

| | | |
|---|---|---|
| 3,759,282 | 9/1973 | Kaldenback et al. . |
| 4,249,556 | 2/1981 | Waletzko . |
| 4,396,350 | 8/1983 | Kinney et al. . |
| 4,563,367 | 1/1986 | Sherman . |
| 4,903,937 | 2/1990 | Jakubiec et al. . |
| 4,962,726 | 10/1990 | Matsushita et al. . |
| 5,090,356 | 2/1992 | Nath et al. . |
| 5,131,460 | 7/1992 | Krueger . |
| 5,469,885 | 11/1995 | Nishimura . |
| 5,496,409 | 3/1996 | Chen . |
| 5,505,704 | 4/1996 | Pawelka et al. . |
| 5,641,455 | 6/1997 | Rosenlund et al. . |
| 5,651,868 | 7/1997 | Canady et al. . |
| 5,669,405 | 9/1997 | Engelmann . |
| 5,674,123 | 10/1997 | Roberson et al. . |
| 5,769,948 | 6/1998 | Oh et al. . |

*Primary Examiner*—Gerald A. Michalsky
*Attorney, Agent, or Firm*—Pierce Atwood; Patrick R. Scanlon

[57] ABSTRACT

An additional isolation valve is incorporated into a vacuum processing system to increase the life of the system's mechanical pump, reduce maintenance costs and downtime, prevent particle back streaming and reduce safety risks to maintenance technicians. The system has a process chamber with at least one port, a foreline valve connected to the port, and a vacuum manifold in fluid communication with the foreline valve. The mechanical pump is connected to the vacuum manifold for evacuating the contents of the process chamber. The isolation valve is connected between the foreline valve and the vacuum manifold and is operated in unison, or primarily in unison, with the foreline valve.

15 Claims, 2 Drawing Sheets

PROCESSING SYSTEM HAVING VACUUM MANIFOLD ISOLATION

BACKGROUND OF THE INVENTION

This invention relates generally to vacuum processing systems and more particularly to isolating the vacuum manifold in such systems.

Semiconductor devices, among other articles, are commonly fabricated by performing a series of process steps inside an airtight chamber maintained below atmospheric pressure. Systems for semiconductor fabrication typically comprise a mechanical pump for evacuating the process chamber via a vacuum manifold. The contents of the process chamber, which include residual particles and byproducts of the fabrication process, are pumped to a burn box for destruction. The process chamber is isolated from the mechanical pump and the vacuum manifold by a foreline valve. The foreline valve is in its open state during processing and is in its closed state during a majority of system maintenance tasks.

A throttle valve is located immediately downstream of the foreline valve to control the pressure in the process chamber. The throttle valve is connected to the vacuum manifold by a flexible hose, commonly referred to as the foreline flex hose. The flexible nature of the flex hose facilitates making the connection between the throttle valve and the vacuum manifold. Also, the flex hose is able to contract while the mechanical pump is operating, which reduces the stress on the other components of the system.

Such processing systems require a number of maintenance tasks, both scheduled and unscheduled. For instance, the throttle valve and flex hose need to be periodically removed for cleaning. Because the operations within the process chamber are typically carried out at temperatures significantly higher than room temperature, the byproducts exiting the process chamber are at a high temperature and tend to condense on the interior surfaces of the throttle valve and the flex hose, which are generally at room temperature. Buildup of these condensates can create restrictions; restrictions in the foreline can cause backpressure and a failure to pump down all of the residual particles.

Custom heated jackets made to fit over the throttle valve, and even the flex hose if desired, are available. By heating the components they enclose to the higher temperature of the processing chamber, such jackets are generally effective at preventing condensation where used. However, this means that condensate build-up is simply moved downstream of the jackets. Furthermore, use of such jackets results in increased energy costs and increased maintenance time for jacket removal.

To remove the flex hose and throttle valve for cleaning or other maintenance, a technician must shut down the mechanical pump, remove the flex hose, install a blank-off cap on the inlet of the vacuum manifold, and then restart the mechanical pump. This process has a number of drawbacks. First, it is a relatively lengthy process that leads to excessive downtime and greater maintenance costs. Second, in the case of dry mechanical pumps, this process increases the risk of pump seizure because such pumps are more likely to seize up while turned off. A seized pump requires the expense of replacing or rebuilding. Lastly, because unexpectedly high pressure in the foreline could cause byproducts to spew out of the flex hose as it is disconnected, the removal of the flex hose is when the maintenance technician is most likely to be exposed to potentially harmful byproducts.

Frequent service of the burn box is another maintenance task necessary with such processing systems. The mechanical pump is shut down during burn box maintenance, and the system is purged with nitrogen while the mechanical pump is not operating. Besides the risk of pump seizure associated with dry mechanical pumps, this procedure suffers from the additional problem that any residual particles not fully removed because of restrictions in the foreline will tend to migrate back to the process chamber during the nitrogen purge.

Accordingly, there is a need for a vacuum processing system that minimizes the need to shut down the mechanical pump during system maintenance, thereby increasing the life of the mechanical pump, avoids back streaming of particles, reduces maintenance cost and downtime so as to increase tool availability time, and reduces safety risks to maintenance technicians.

SUMMARY OF THE INVENTION

The above-mentioned needs are met by the present invention which provides a vacuum processing system having a process chamber with at least one port, a foreline valve connected to the port, and a vacuum manifold in fluid communication with the foreline valve. A pump is connected to the vacuum manifold for evacuating the contents of the process chamber, and an isolation valve is connected between the foreline valve and the vacuum manifold. The isolation valve is operated in unison, or primarily in unison, with the foreline valve and preferably has its valve seat installed in the direction of the pump.

By including the isolation valve in addition to the foreline valve, the present invention overcomes the above-mentioned drawbacks of conventional processing systems. Namely, closing the isolation valve prior to removing the flex hose for maintenance will eliminate the need to shut down the mechanical pump. This will increase the life of the mechanical pump and reduce maintenance costs and downtime. Also, closing the isolation valve during maintenance will isolate the flex hose from the vacuum manifold so as to prevent particle back streaming and reduce safety risks to maintenance technicians.

Other advantages of the present invention will become apparent upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
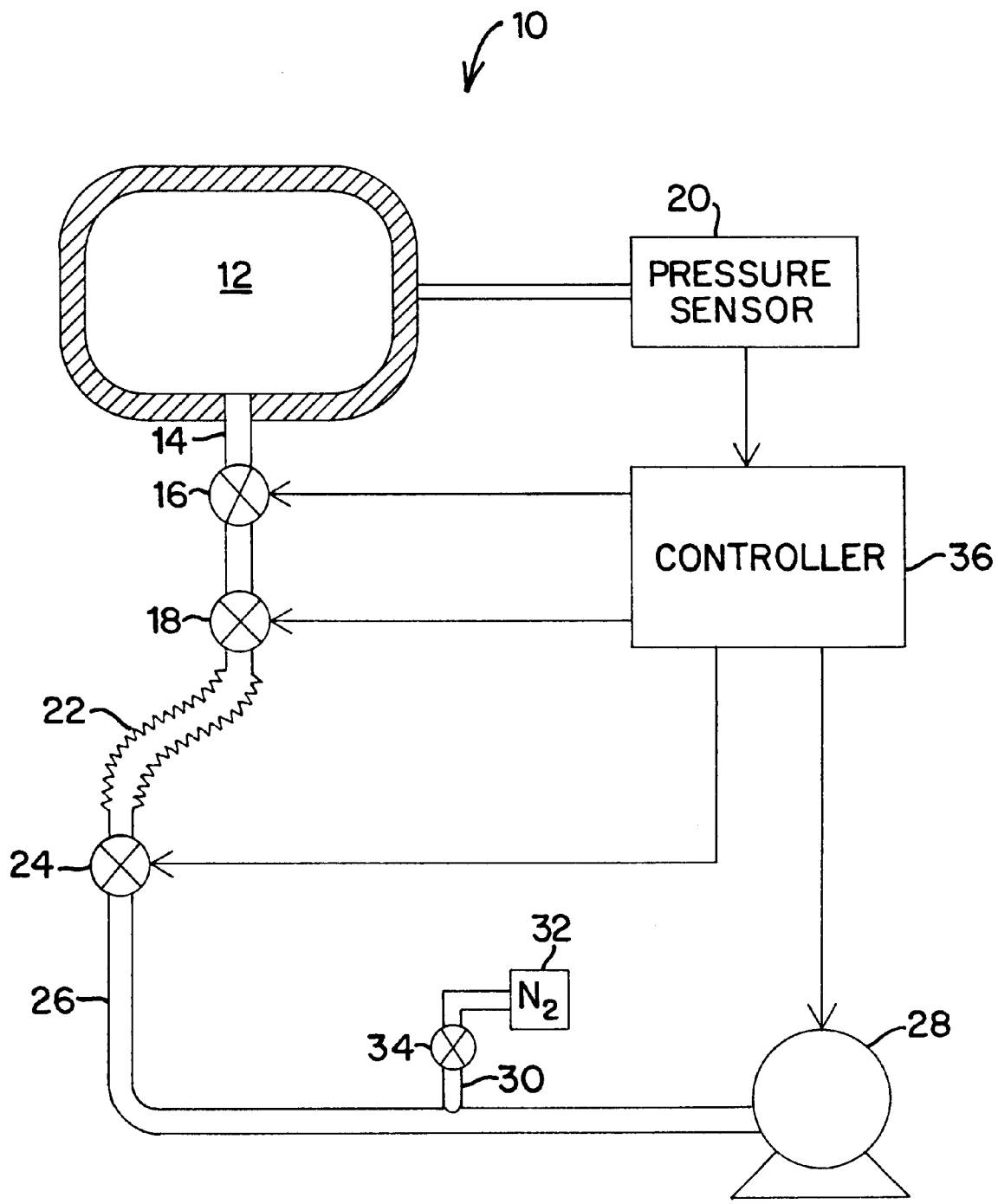
FIG. 1 is a schematic depiction of the vacuum processing system of the present invention.

Referring to the drawings wherein identical reference numerals denote the same elements throughout the various views, FIG. 1 shows a vacuum processing system 10 in accordance with the present invention. The system 10 includes a process chamber 12 in which a workpiece, such as a semiconductor device, is processed. (The present invention is not limited to semiconductor processing systems; it is applicable to any sort of processing system that uses a vacuum process chamber.) The process chamber 12 is a closed, airtight structure capable of being maintained below atmospheric pressure and includes a vacuum port 14 through which the internal contents of the chamber 12 are evacuated.

A foreline valve 16 is connected to the outlet of the vacuum port 14. The foreline valve 16 isolates the process chamber 12 from the rest of the system 10 and is preferably a normally closed, pneumatically operated valve. A throttle valve 18 is connected to the foreline valve 16 for regulating the process chamber pressure. The process chamber 12 also includes a pressure sensor 20, such as a capacitance manometer, for monitoring the process chamber pressure.

The throttle valve 18 is also connected to one end of a flexible hose 22, such as an accordion or bellows type of hose. As described above in connection with conventional systems, the flexible hose 22 facilitates connecting the chamber 12, the foreline valve 16 and the throttle valve 18 to the rest of the system 10 and reduces stress on the other system components. The other end of the flexible hose 22 is connected to an isolation valve 24. Like the foreline valve 16, the isolation valve 24 is preferably a normally closed, pneumatically operated valve. As will be described in more detail below, the isolation valve 24 is operated in unison with the foreline valve 16; i.e., the isolation valve 24 is open when the foreline valve 16 is open and closed when the foreline valve 16 is closed.

A vacuum manifold 26 is connected at one end to the isolation valve 24 and at its other end to a mechanical pump 28. The pump 28 can be either a dry or wet mechanical pump. Thus, when the foreline and isolation valves 16, 24 are open and the mechanical pump 28 is operating, the contents of the process chamber 12 will be evacuated via the flexible hose 22 and the vacuum manifold 26 to create a vacuum in the chamber 12. The mechanical pump 28 pumps the chamber contents to a burn box (not shown) for destruction in a conventional manner. Alternatively, the chamber contents could be exhausted to the environment when it would be safe to do so. The vacuum manifold 26 includes an inlet port 30 that is connected to a source of nitrogen gas 32 via a ballast valve 34. The ballast valve 34 is controlled so that the system 10 will be purged with nitrogen when needed.

Control of the system 10 is achieved by a controller 36, which may be any kind of control unit, such as a microprocessor, capable of receiving operator input. Specifically, the controller 36 controls the opening and closing of the foreline valve 16 and the isolation valve 24, as well as the operation of the mechanical pump 28. In a preferred embodiment, the foreline valve 16 and the isolation valve 24 are synchronized so that whenever the controller software opens or closes one valve (or whenever an operator inputs an instruction to the controller 36 to open or close either valve), the other valve will be automatically opened or closed, respectively. The valves 16, 24 will be open during processing and closed during most maintenance tasks. Between processing cycles, i.e., the time when a finished workpiece is removed from the process chamber 12 and a new workpiece is inserted, the valves 16, 24 can be either open or closed, depending on the type of process being run. The controller 36 also regulates the throttle valve 18 in response to the pressure sensor 20 so as to control the pressure in the process chamber 12.

In another preferred embodiment, the valves 16, 24 are operated independently between processing cycles. During this time, the foreline valve 16 is closed and the isolation valve 24 is opened, rather than having both valves closed. The valves 16, 24 are operated in unison at all other times. This embodiment is useful for particularly "dirty" processes, i.e., processes employing materials that generate excessive byproducts and running at high flow rates.

In operation, a workpiece is positioned within the process chamber 12, and the mechanical pump 28 is activated to create a vacuum condition in the chamber 12. The foreline and isolation valves 16, 24 are opened and remain open for as long as the processing is going on. In the case of semiconductor fabrication, process byproducts and particles removed from the semiconductor device will be pumped out of the process chamber 12. As discussed above, the byproducts exit the process chamber 12 at relatively high temperatures and tend to condense on the interior surfaces of the throttle valve 18 and the flexible hose 22. These condensates can build up and create restrictions that will lead to a failure to pump down all of the residual particles as well as negatively impacting process chamber performance.

The throttle valve 18 and the flexible hose 22 will need to be periodically cleaned. To do this, the technician will simply close both the isolation valve 24 and the foreline valve 16 through an appropriate input to the controller 36 and then remove the flexible hose 22 for cleaning in a conventional manner. A manual $N_2$ purge valve could be added to the process chamber side of the isolation valve 24 for the purpose of venting the flexible hose 22 prior to removal. There is no need to shut down the mechanical pump 28 and thus run the risk of sustaining a pump seizure. Using the isolation valve 24 is less time consuming so as to increase tool availability time and reduce maintenance cost. Moreover, because the isolation valve 24 separates the flexible hose 22 from the pressurized nitrogen source 32 prior to hose removal, the hose 22 is not under pressure when removed. This significantly reduces the likelihood of the technician being exposed to byproducts during hose maintenance.

The isolation valve 24 will also be closed during burn box maintenance. The closed isolation valve 24 will prevent the migration of residual particles back toward the process chamber 12, which can occur in conventional vacuum processing systems during nitrogen purge.

Figure 2:
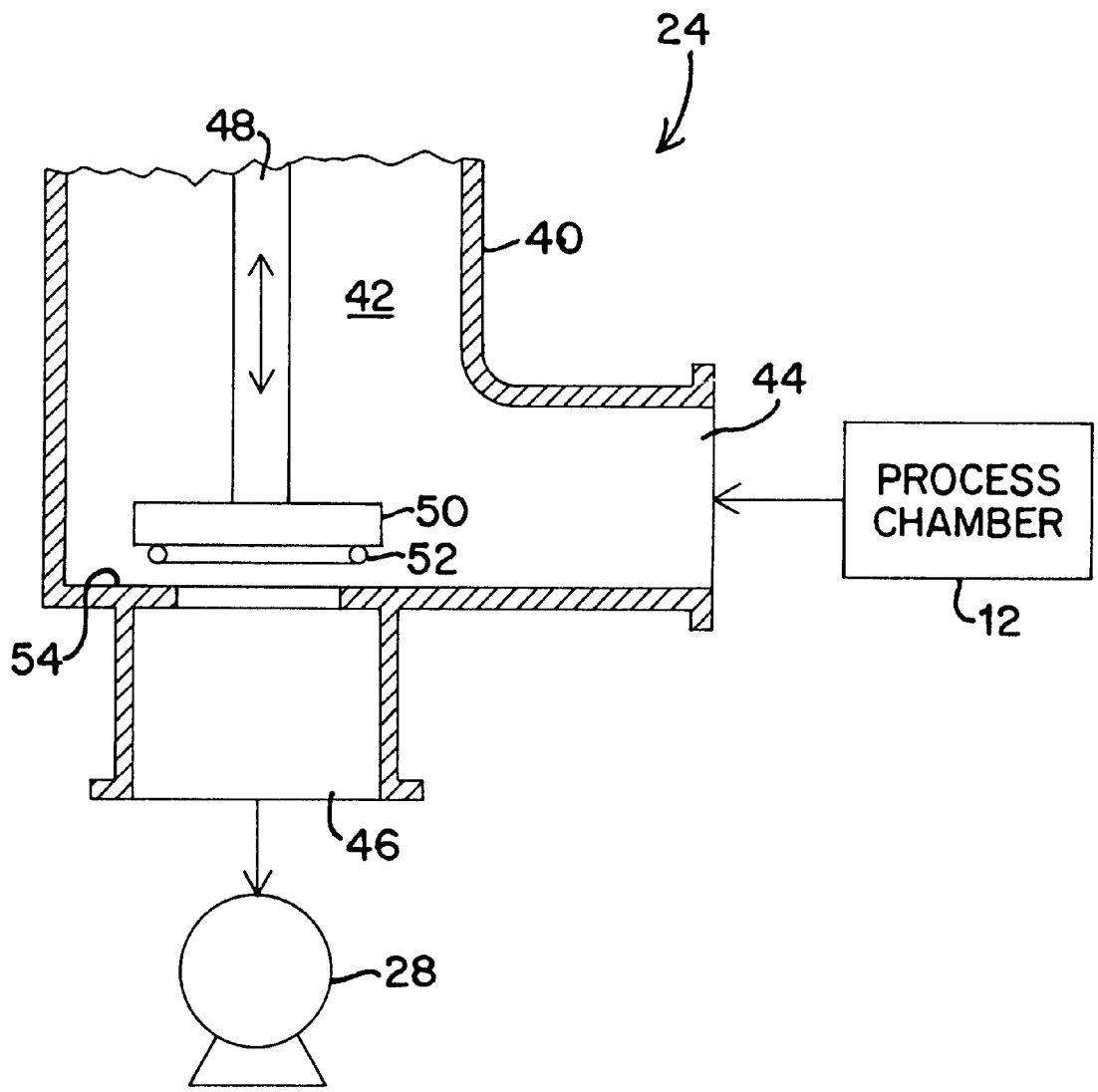
FIG. 2 is a simplified, sectional view of an isolation valve in the vacuum processing system of the present invention.

The isolation valve 24 is preferably installed so that when it is in its normally closed state, the vacuum created by the mechanical pump 28 does not tend to force the valve 24 open. To illustrate this feature, FIG. 2 shows a simplified depiction of one possible embodiment of the isolation valve 24. This depiction is merely for illustrative purposes and is not intended to limit in any way the present invention to this type of valve; any number of suitable valves can be used for the isolation valve 24.

As shown in FIG. 2, isolation valve 24 comprises a housing 40 having an interior cavity 42 formed therein. A first port 44 is located in the side of the housing 40, and a second port 46 is formed in the center of the bottom of the housing 40. Both ports 44, 46 are in fluid communication with the interior cavity 42. A valve stem 48 is disposed inside the housing 40 and is displaceable along its longitudinal axis by an actuation means (not shown) in response to the controller 36. A plunger 50 carrying an O-ring 52 is disposed on the end of the valve stem 48. A valve seat 54 is formed at the junction of the interior cavity 42 and the second port 46, concentrically aligned with the valve stem 48. Thus, when the valve stem 48 is displaced toward the valve seat 54, the O-ring 52 sealingly engages the valve seat 54 to close the valve 24.

The first port 44 is connected to the process chamber 12 (via the flexible hose 22, the throttle valve 18 and the foreline valve 16), and the second port 46 is connected to the mechanical pump 28 (via the vacuum manifold 26). In this arrangement, the valve seat 54 is installed in the direction of the mechanical pump 28. Thus, when the valve 24 is closed and the mechanical pump 28 is operating, the vacuum created by the pump 28 will work to maintain the valve 24 in its closed state, not try to open it.

The foregoing has described a vacuum processing system having an isolation valve for improving system maintenance and safety. While specific embodiments of the present invention have been described, it will be apparent to those skilled in the art that various modifications thereto can be made without departing from the spirit and scope of the invention as defined in the appended claims.

What is claimed is:

1. A processing system comprising:
    a process chamber having at least one port;
    a foreline valve connected to said at least one port;
    a vacuum manifold in fluid communication with said foreline valve;
    a pump connected to said vacuum manifold; and
    an isolation valve connected between said foreline valve and said vacuum manifold for selectively isolating said vacuum manifold.

2. The processing system of claim 1 further comprising a controller for controlling said foreline valve and said isolation valve.

3. The processing system of claim 2 wherein said controller opens and closes said foreline valve and said isolation valve in unison.

4. The processing system of claim 1 further comprising a throttle valve connected between said foreline valve and said isolation valve.

5. The processing system of claim 4 further comprising a controller for controlling said throttle valve.

6. The processing system of claim 5 further comprising a process chamber pressure sensor, said controller controlling said throttle valve in response to said pressure sensor.

7. The processing system of claim 4 further comprising a flexible hose connected between said throttle valve and said isolation valve.

8. The processing system of claim 1 further comprising a flexible hose connected between said foreline valve and said isolation valve.

9. The processing system of claim 1 further comprising a source of nitrogen connected to said vacuum manifold.

10. The processing system of claim 1 wherein said isolation valve has a valve seat that is installed in the direction of said pump.

11. A processing system comprising:
    a process chamber having at least one port;
    a foreline valve connected to said at least one port;
    a throttle valve connected to said foreline valve;
    an isolation valve connected to said throttle valve;
    a pump connected to said isolation valve to evacuate said process chamber through said foreline valve, said throttle valve and said isolation valve; and
    a controller connected to said pump, said foreline valve, said throttle valve and said isolation valve.

12. The processing system of claim 11 wherein said controller opens and closes said foreline valve and said isolation valve in unison.

13. The processing system of claim 11 further comprising a process chamber pressure sensor, said controller controlling said throttle valve in response to said pressure sensor.

14. The processing system of claim 11 further comprising a flexible hose connected between said foreline valve and said isolation valve.

15. The processing system of claim 11 wherein said isolation valve has a valve seat that is installed in the direction of said pump.

* * * * *